US012238119B1

(12) United States Patent
Chivu et al.

(10) Patent No.: US 12,238,119 B1
(45) Date of Patent: Feb. 25, 2025

(54) DETERMINING THREATS FROM ANOMALOUS EVENTS BASED ON ARTIFICIAL INTELLIGENCE MODELS

(71) Applicant: Amazon Technologies, Inc., Seattle, WA (US)

(72) Inventors: Radu Stefan Chivu, Kenmore, WA (US); Daniel Lee Moor, Midland, MI (US); Saad Ali Rana, Charlotte, NC (US)

(73) Assignee: Amazon Technologies, Inc., Seattle, WA (US)

( * ) Notice: Subject to any disclaimer, the term of this patent is extended or adjusted under 35 U.S.C. 154(b) by 372 days.

(21) Appl. No.: 17/544,538

(22) Filed: Dec. 7, 2021

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1441* (2013.01); *H04L 63/20* (2013.01)

(58) Field of Classification Search
CPC . H04L 41/16; H04L 63/1416; H04L 63/1441; H04L 63/20
See application file for complete search history.

(56) References Cited

U.S. PATENT DOCUMENTS

| 11,017,321 | B1* | 5/2021 | Mishra | G05B 23/0283 |
|---|---|---|---|---|
| 2021/0014252 | A1* | 1/2021 | Usher | H04L 63/1416 |
| 2023/0022709 | A1* | 1/2023 | Chiu | H04L 63/1416 |
| 2023/0102002 | A1* | 3/2023 | Garapati | H04L 41/0636 |
| | | | | 709/223 |

OTHER PUBLICATIONS

Wikipedia, "Self-Organizing Map," Available online At: https://en.wikipedia.org/wiki/Self-organizing_map, Accessed from Internet on Dec. 1, 2021, 10 pages.
Wikipedia, "Word2vec," Available online At: https://en.wikipedia.org/wiki/Word2vec, Accessed from Internet on Dec. 1, 2021, 7 pages.

* cited by examiner

*Primary Examiner* — Gil H. Lee
(74) *Attorney, Agent, or Firm* — Kilpatrick Townsend & Stockton LLP

(57) ABSTRACT

Threats can be determined from anomalous events based on artificial intelligence (AI) models. For example, a computer system stores, based on an output of a first AI model, first information indicating that a first event cluster of the first event clusters is associated with a threat classification and that a second event cluster of the first event clusters is associated with a non-threat classification. The computer system receives a first dataset representing first events and generate a first input to the first AI model based on the first dataset. The computer system determines, based on the first input to the first AI model, second event clusters and that a third event cluster of the second event clusters has no correspondence in the first event clusters and is associated with an unknown classification. The computer system generates second information indicating that the third event cluster is associated with the unknown classification.

20 Claims, 13 Drawing Sheets

DETERMINING THREATS FROM ANOMALOUS EVENTS BASED ON ARTIFICIAL INTELLIGENCE MODELS

BACKGROUND

A client-server architecture may be implemented to provide a network service. Client can interact with a server to access the network service. Certain interactions may be anomalous and can correspond to fraudulent events or network threats.

To illustrate, the network service may include a content streaming service. Content can be presented at a user device upon a request by the user device for the content. Different content types are possible, including a music, movies, or television shows that may be associated by a content provider. Processing content requests may involve determining whether a request is associated with a threat event, which may improperly impact the user device or the network service.

BRIEF DESCRIPTION OF THE DRAWINGS

Various embodiments in accordance with the present disclosure will be described with reference to the drawings, in which.

DETAILED DESCRIPTION

Figure 1:
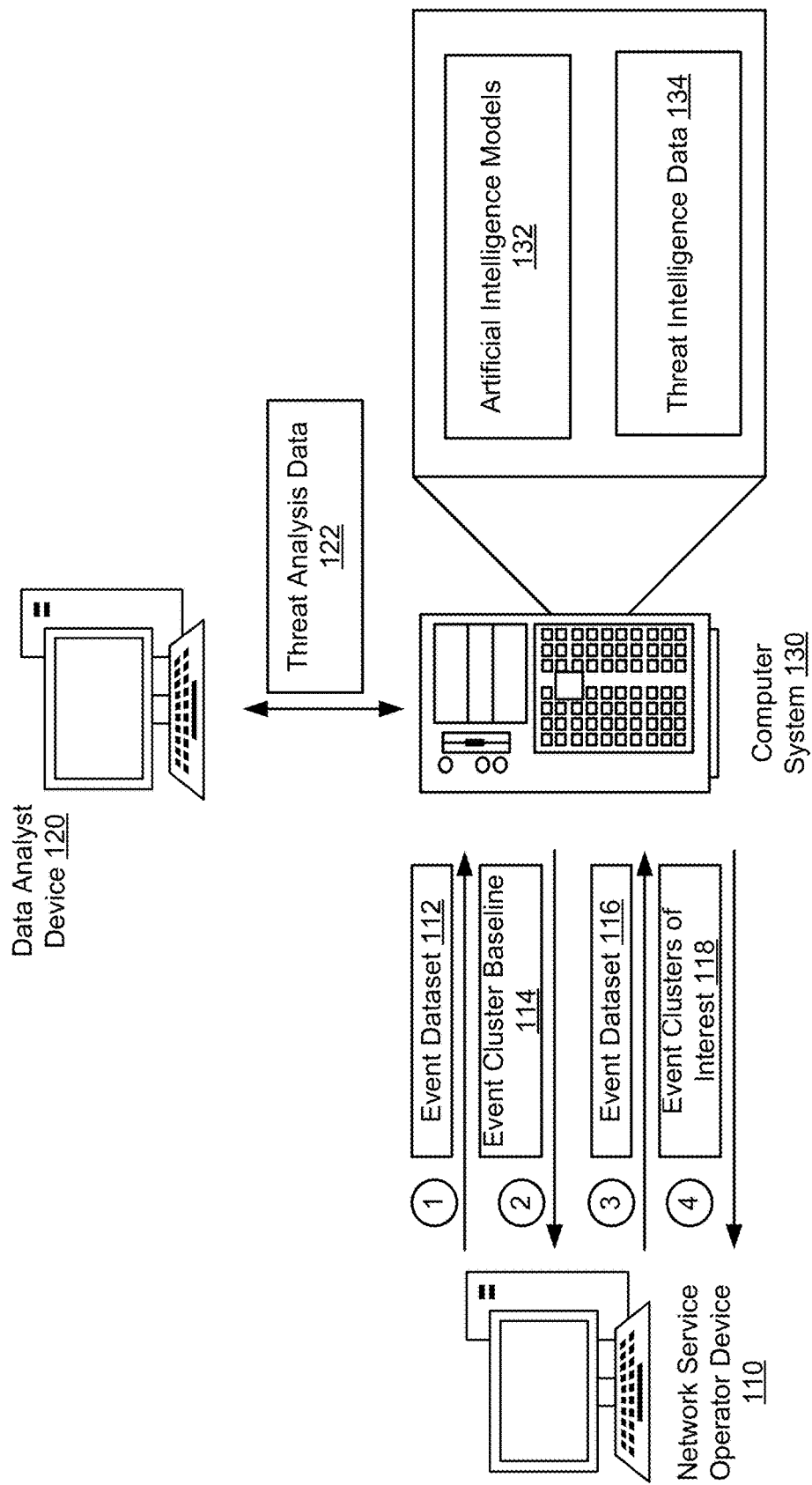
FIG. 1 illustrates an example of a system for determining threats from anomalous events, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, determining threats from anomalous events based on artificial intelligence (AI) models. In an example, a computer system receives a first dataset that represents first events and generates an input to a first AI model based on the first dataset. The first input can include first event vectors generated from the first dataset. The computer system can determine first event clusters by inputting the first input to the first AI model. The computer system stores first information about the first event clusters. The first information may indicate that a first event cluster of the first event clusters is associated with a threat classification and that a second event cluster of the first event clusters is associated with a non-threat classification. The computer system can receive a second dataset that represents second events and generate a second input to the first AI model based on the second dataset. The computer system determines, based on the second input to the first AI model, second event clusters. The computer system can determine that a third event cluster of the second event clusters has no correspondence in the first event clusters and is associated with an unknown classification. The computer system can generate second information about the third event cluster that indicates that the third event cluster is associated with the unknown classification. The third event cluster may then be analyzed to determine whether events associated with the third event cluster are associated with a threat.

To illustrate, consider a system that processes content request event data to detect anomalous events and threats in the content request events. An initial event dataset of content request events can be received by a computer system. The computer system can generate event vectors for the initial event dataset and input the event vectors into a variational auto-encoder that determines anomaly scores for the content request events. The anomaly scores can be used to select a subset of the content event requests for classification. A self-organizing map can receive event vectors corresponding to the subset to generate baseline cluster information. The baseline information can identify a number of clusters. Based on its size, a cluster can be associated with a classification (e.g., if the size exceeds a threshold size, the cluster can determined to have a non-threat classification). At another point in time, the computer system can receive a production event dataset of content request events. The computer system can generate event vectors for the production event dataset and input the event vectors to the variational auto-encoder to determine a production event subset and input the event vectors of this subset to the self-organizing map for clustering. The baseline event clusters can be compared to the production event clusters to determine whether a production event cluster corresponds to a baseline event cluster having a non-threat classification, a baseline event cluster having a threat-classification, or a new event cluster for which no correspondence to a baseline cluster exists. Such a new event cluster can be associated with an unknown classification. The unknown classification can indicate that production events associated with the new event cluster are to be further evaluated for threat.

Embodiments of the present disclosure may provide technical improvements over conventional techniques for detecting threats associated with event data. For example, this process may be performed automatically from end-to-end, without a need for an operator to manually determine whether an event cluster is associated with a threat classification or a non-threat classification. Even if manual input is invoked, the manual input can be limited to new event clusters, rather than the full set of event clusters. As a result, anomalies and threats may be identified in less time, thereby reducing an impact of the threat to client devices and/or network services. In other words, network security can be improved because threat detection is accurately and quickly performed. Further, filtering event data based on determined anomaly scores for the event data can reduce an amount of data that the computer system processes without reducing an accuracy of identifying anomalies and threats, which can reduce the time and computing resources involved in the threat determination.

Furthermore, and as described herein below, any type of data can be processed without needing the data to have a particular structure or include particular fields (e.g., data using a standardized web log format). Instead, baseline clustering information can be generated from the data and subsequently used to further assess any additional data. In this way, the anomaly and clustering processing can be offered as a service to different subscribers agnostically of the underlying data structures.

In the interest of clarity of explanation, various embodiments of the present disclosure are described in connection with content events associated with an online content service (e.g., requests for movie playbacks supported by a movie streaming service). However, the embodiments are not limited as such and similarly apply to the processing of any type of events related to a service, where the processing involves determining anomalous events and clustering such events.

FIG. 1 illustrates an example of a system for determining threats from anomalous events, according to an embodiment of the present disclosure. Threat detection may be offered as a service available from a computer system 130. An operator can provide a network service to client devices (e.g., a content streaming service). A device of this operator (illustrated as a network service operator device 110) can send data to the computer system 130 that, as part of the services, responds with threat-related information. In an example, the network service operator device 110 can make an application programming interface (API) call to the computer system 130 for the computer system 130 to perform the service. Along with the API call, the network service operator device 110 can send an event dataset 112. The event dataset 112 can represent events about the network service of the operator. In the case of content streaming service, the event dataset 112 indicates content request events, such as requests for movie playback, language selection, subtitle selection, etc.

Upon receiving the event dataset 112, the computer system 130 can use AI models 132 to determine an event cluster baseline 114 for the event dataset 112. A first AI model of the AI models 132 can be a variational auto-encoder trained to determine an anomaly score for each event in the event dataset 112. When available, threat intelligence data 134 of known threat event data and associated anomaly scores may be used during training so that the variational auto-encoder learns how to determine anomaly scores for the event dataset 112. During training, the anomaly scores may be used to filter portions of a training event dataset that are to be used for cluster training. For the training, the computer system 130 may compare each anomaly score to a threshold, and events having anomaly scores greater than the threshold may be included in a final training dataset of clustering. During inference, the event dataset 112 may, but need not, be filtered. The events of the event dataset 112 can be input into a second AI model of the AI models 132. The second AI model can be a self-organizing map trained to cluster events. The second AI model can output the event cluster baseline 114. The event cluster baseline 114 can be a set of clusters that group the events.

The event cluster baseline 114 may include different classifications for the clusters. For example, a portion of the clusters may be associated with a threat classification, and another portion of the clusters may be associated with a non-threat classification. The threat intelligence data 134 may be used by the self-organizing map to learn how to classify clusters in the event cluster baseline 114. If the threat intelligence data 134 is not available and/or event if available, input from a data analyst can be used for the classifications of the event clusters. In particular, the event cluster baseline 114 along with relevant events may be sent to a data analyst device 120. A data analyst may operate the data analyst device 120 to input classifications of the event cluster baseline 114. The classifications can be returned as threat analysis data 122 to the computer system 130. The computer system 130 can store and send the event cluster baseline 114 to the network service operator device 110.

In an example, at a later point in time, the network service operator device 110 can send an event dataset 116 to the computer system 130, such as with a subsequent API call. The event dataset 116 can correspond to a second set of content request events. The AI models 132 can determine anomaly scores and clusters for the event dataset 116. The computer system 130 can determine whether the clusters for the event dataset 116 correspond to clusters in the event cluster baseline 114 or not. The computer system 130 can generate a similarity score for any event that is determined to correspond to a cluster in the event cluster baseline 114. The similarity score can be between the event and the events in the corresponding cluster in the event cluster baseline 114. A string similarity algorithm can be used to determine the similarity score. If the similarity score is below a threshold (e.g., 25%), the computer system 130 may discard the event from the cluster. Any cluster determined to not correspond to a cluster in the event cluster baseline 114 can be considered to be a cluster of interest. The computer system 130 can then send an indication of event clusters of interest 118 to the network service operator device 110, indicating to the network service operator device 110 which events are to be further investigated for potential threat activity. Information about such event cluster can also be sent to the data analyst device 120 for further analysis.

Figure 2:
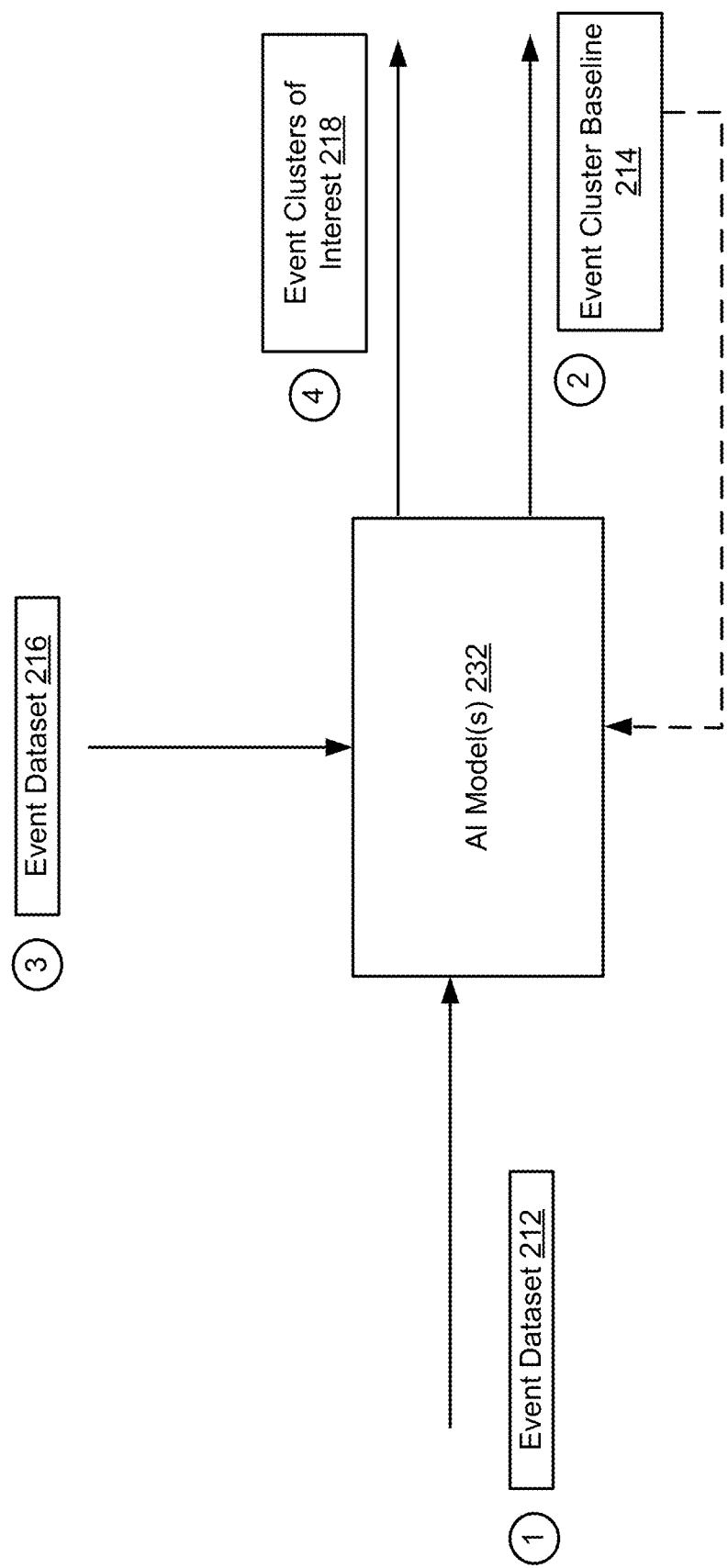
FIG. 2 illustrates a block diagram of an example of using artificial intelligence model(s) to determine anomalous events, according to an embodiment of the present disclosure.

FIG. 2 illustrates a block diagram of an example of using AI model(s) 232 to determine anomalous events, according to an embodiment of the present disclosure. The AI model(s) 232 can correspond to one or more of the AI models 132 in FIG. 1. The AI model(s) 232 can receive an event dataset 212 of first content request events. The event dataset 212 can include data representing events, where the data need not have a particular structure (e.g., web log data). The AI model(s) 232 can include a variational auto-encoder for determining anomaly scores for the events in the event dataset 212. During training, the anomaly scores can be used to determine anomalous events as a subset of the events. As indicated above, an event having an anomalous score larger than a threshold score can be determined to be an anomalous event. The AI model(s) 232 can also include a self-organizing map for clustering the events to generate an event cluster baseline 214.

When additional event data is available, or at a predetermined time interval, an event dataset 216 of second content request events is received by the AI model(s) 232. The AI model(s) 232 may score such events, cluster events, and determine whether the clusters correspond to clusters in the event cluster baseline 214. New clusters that do not correspond to a cluster in the event cluster baseline 214 can be included in event clusters of interest 218. Additionally, new anomalous events that are associated with a known threat cluster can be identified as events of interest. The event clusters of interest 218 and, as applicable, events of interest can then be further analyzed to determine an associated threat. If an event cluster of interest is determined to be associated with a threat, the event cluster baseline 214 can be updated to include the event cluster of interest as a known threat cluster.

Figure 3:
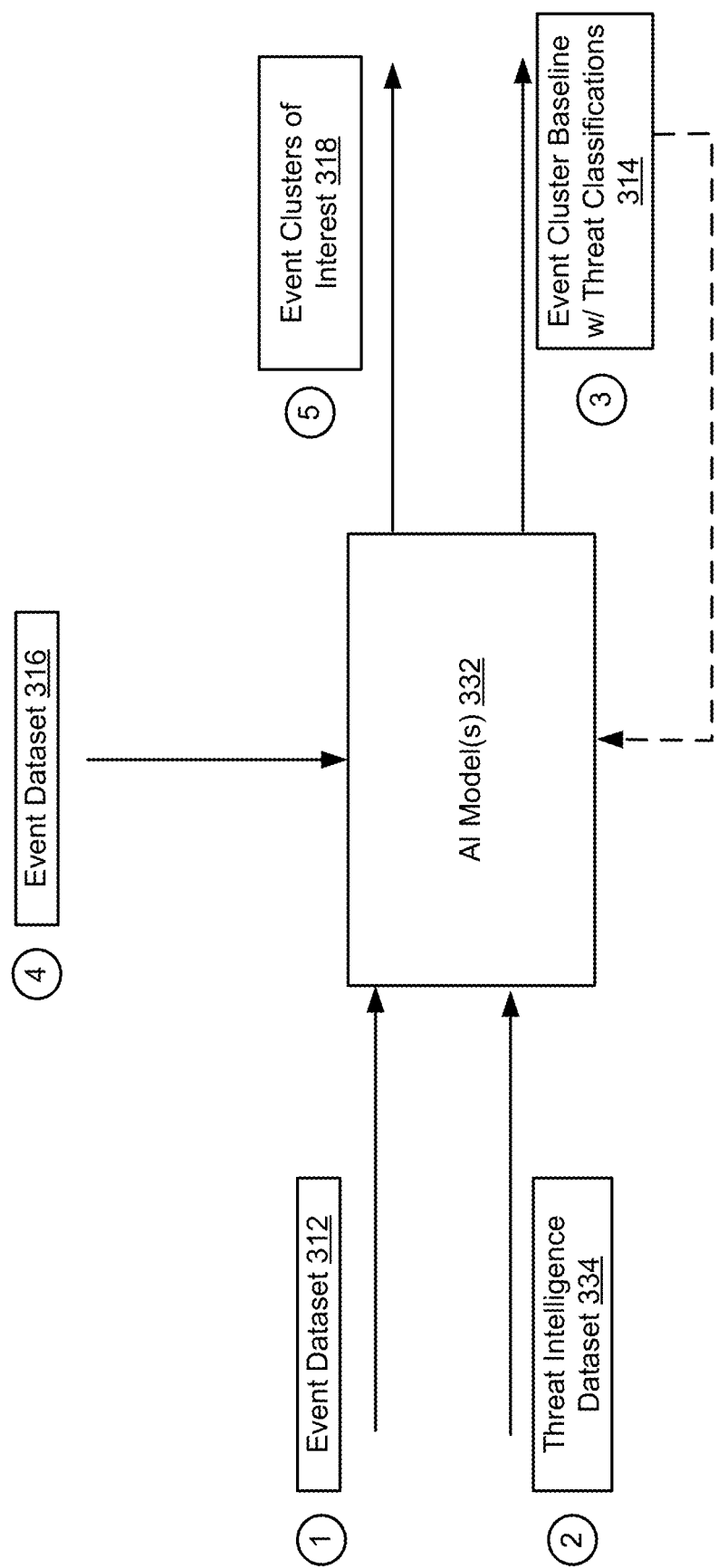
FIG. 3 illustrates a block diagram of another example of using artificial intelligence model(s) to determine anomalous events, according to an embodiment of the present disclosure.

FIG. 3 illustrates a block diagram of another example of using AI model(s) 332 to determine anomalous events, according to an embodiment of the present disclosure. The AI model(s) 332 can correspond to one or more of the AI models 132 in FIG. 1. The AI model(s) 332 can include a variational auto-encoder for determining anomaly scores for events. The AI model(s) 332 can also include a self-organizing map for clustering events.

The AI model(s) 332 can receive an event dataset 312 of first content request events. The AI model(s) 332 can also receive a threat intelligence dataset 334 corresponding to known threat events. The AI model(s) 332 can perform the clustering based on both datasets 312 and 332. If an event from the threats intelligence dataset 334 is associated with a first cluster, the first cluster can be declared to be a threat cluster. In this case, events from the event dataset 312 also associated with the first cluster can, therefore, be classified as being threat events. In comparison, if a second cluster does not relate to an event of the threat intelligence dataset 334, the second cluster can be declared to be a non-threat cluster. In this case, events from the event dataset 312 also associated with the second cluster can, therefore, be classified as being non-threat events. Threat and no-threat classifications are described herein as illustrative examples of classifications. Other classifications are likewise possible and can be at a more granular level. Based on the clustering and the classifications, the AI model(s) 332 can output an event cluster baseline with threat classifications 314.

When additional event data is available, or at a predetermined time interval, an event dataset 316 of second content request events is received by the AI model(s) 332. The AI model(s) 332 may score such events, cluster events, and determine whether the clusters correspond to clusters in the event cluster baseline 314. New clusters that do not correspond to a cluster in the event cluster baseline 314 can be included in event clusters of interest 218. Additionally, new anomalous events that are associated with a known threat cluster can be identified as events of interest. The event clusters of interest 318 and, as applicable, events of interest can then be further analyzed to determine an associated threat. If an event cluster of interest is determined to be associated with a threat, the event cluster baseline 314 can be updated to include the event cluster of interest as a known threat cluster.

Figure 4:
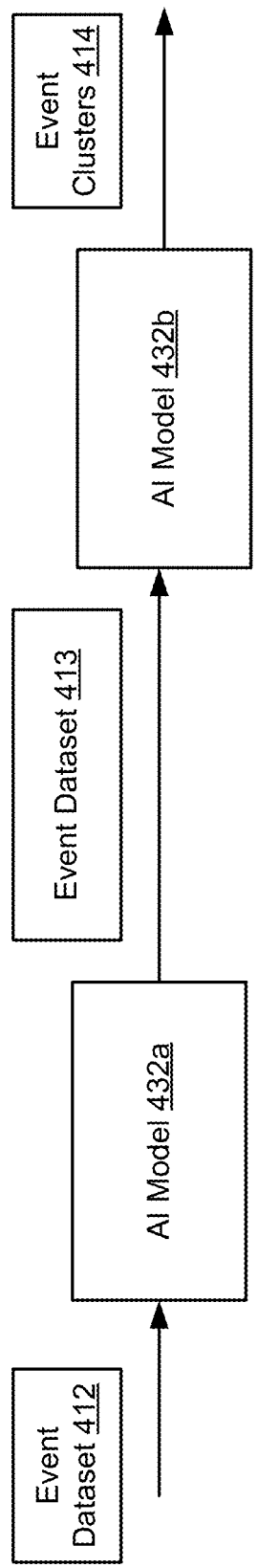
FIG. 4 illustrates a block diagram of an example of clustering events using artificial intelligence models, according to an embodiment of the present disclosure.

FIG. 4 illustrates a block diagram of an example of clustering events using AI models, according to an embodiment of the present disclosure. An AI model 432a receives an event dataset 412 representing content request events. The AI model 432a can include a variational auto-encoder trained for anomaly scoring. Based on the event dataset 412, the AI model 432a determines a subset of events in the event dataset 412 that are considered to be anomalous based on the anomaly score associated with each event. Events having an anomaly score above a threshold score may be considered to be anomalous and included in the subset of events.

The AI model 432a can output the event dataset 413, which may include the entire event dataset 412 or the subset of events, to an AI model 432b, which can include a self-organizing map trained for clustering events. That is, the AI model 432b may only receive events from the event dataset 412 that are determined to be anomalous. The AI model 432b can generate event clusters 414 for the event dataset 413, and the event clusters 414 can be further analyzed for threat classification.

Figure 5:
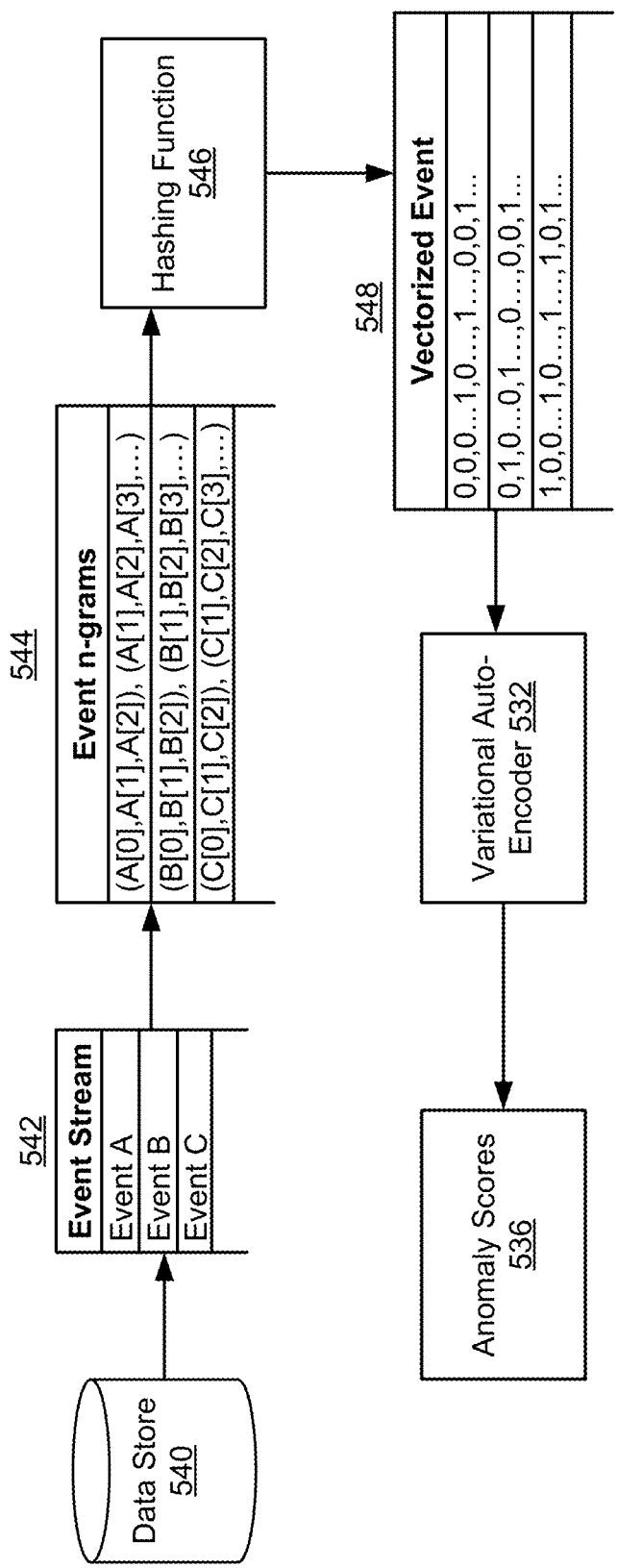
FIG. 5 illustrates a flow diagram of an example of scoring an event dataset using a variational auto-encoder, according to an embodiment of the present disclosure.

FIG. 5 illustrates a flow diagram of an example of scoring an event dataset using a variational auto-encoder 532, according to an embodiment of the present disclosure. An event stream 542, corresponding to the event dataset of content request events, is received from a data store 540. Each event can be a piece of data about a content request (e.g., data indicating the requested content, the time of the request, the type of client device, and the like). Event n-grams 544 are generated from events of the event stream 542. An event n-gram is generated from each event. As illustrated in FIG. 5, an n-gram of 3-grams is used, but other n-grams may be used in other examples. In one particular example, the 3-gram for event A is illustrated as being "(A[0], A[1], A[2]), (A[1], A[2], A[3]) . . . ". A hashing function 546 (e.g., SHA-1 or MD-5) is then performed on the event n-grams 544 to generate an event vector 548 (which can be referred to also as a vectorized event) for each of the events. The event vector for event A is illustrated as being "0, 0, 0 . . . 1, 0 . . . , 0, 0, 1 . . . ".

The variational auto-encoder 532 receives the event vector 548 for each event and generates an anomaly score for the event vector 548 (or, equivalently, the event). A different anomaly score may be determined for each event, whereby multiple anomaly scores 536 are generated across the different events. The variational auto-encoder 532 (or another model) can determine anomalous events based on the anomaly scores 536. For example, an event associated with an anomaly score above a threshold may be determined to be an anomalous event. The anomalous events (or the corresponding event vectors) may then be input to a second AI model, such as a self-organizing map, for determining clusters of the anomalous events.

While generating an event vector by generating n-grams and applying a hashing function to the n-grams is described in FIG. 5 and in additional examples below, other examples may use an event vector generated by a string tokenizer and an embedding generation model. The string tokenizer can separate events into words and the embedding generation model can assign vector values based on the location of the tokenized words in an event. The embedding generation model is trained to reconstruct linguistic contexts of words. The embedding generation model takes as its input a large corpus of text corresponding to events and produces a vector space, with each unique event in the corpus being assigned a corresponding vector in the space. Event vectors are positioned in the vector space such that events that share common contexts in the corpus are located close to one another in the space. The cosine similarity between event vectors indicate the level of semantic similarity between the events represented by those event vectors.

Figure 6:
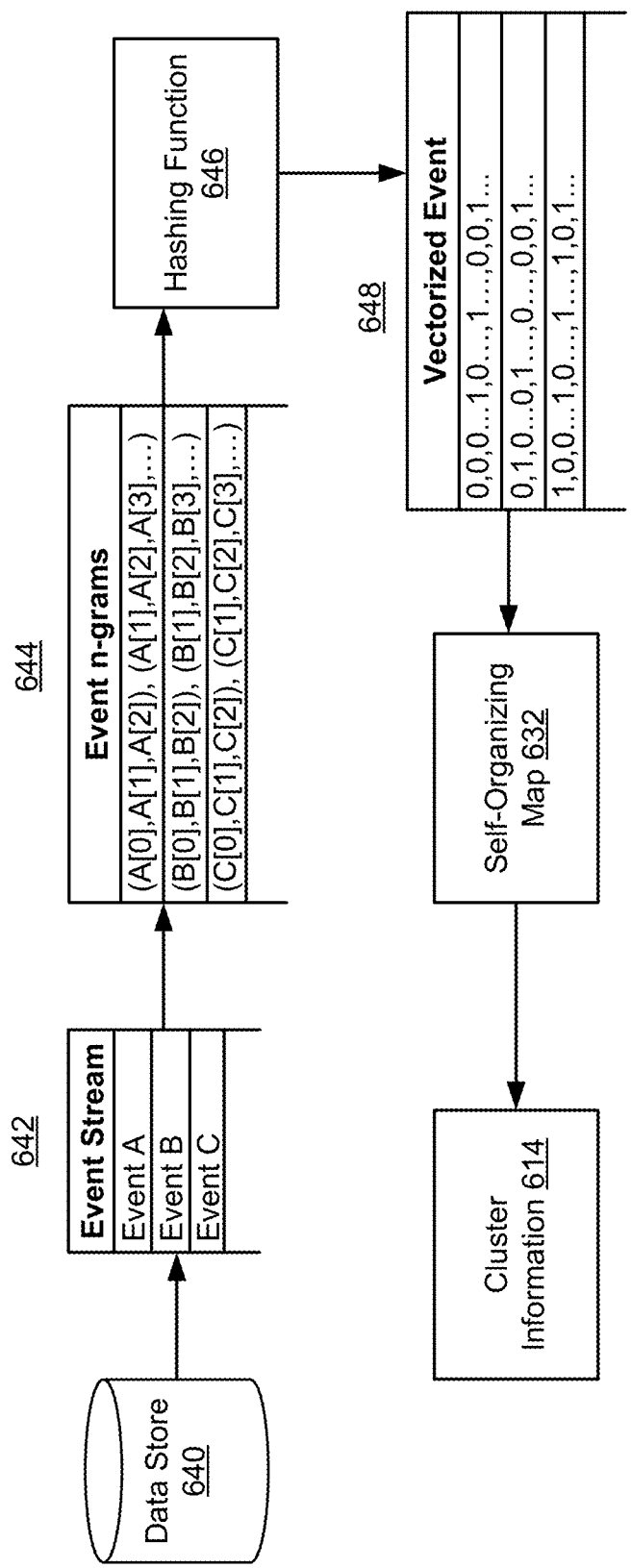
FIG. 6 illustrates a block diagram of an example of clustering an event dataset using a self-organizing map, according to an embodiment of the present disclosure.

FIG. 6 illustrates a block diagram of an example of clustering an event dataset using a self-organizing map 632, according to an embodiment of the present disclosure. An event stream 642, corresponding to the event dataset of content request events, is received from a data store 640. Each event can be a piece of data about a content request (e.g., data indicating the requested content, the time of the request, the type of client device, and the like). Event n-grams 644 are generated from events of the event stream 642. An event n-gram is generated from each event. As illustrated in FIG. 6, an n-gram of 3-grams is used, but other n-grams may be used in other examples. In one particular example, the 3-gram for event A is illustrated as being "(A[0], A[1], A[2]), (A[1], A[2], A[3]) . . . ". A hashing function 646 (e.g., SHA-1 or MD-5) is then performed on the event n-grams 644 to generate an event vector 548 for each of the events. The event vector for event A is illustrated as being "0,0, 0 . . . 1, 0 . . . , 0, 0, 1 . . . ".

The self-organizing map 632 receives the event vector 648 for each event and generates cluster information 614 based on the event vectors. The event vectors (e.g, the event vectors or the identifiers of the events) can be grouped into clusters. Naturally, a cluster associated with a larger number of events can be large in size. A size of a cluster can indicate a likely classification of the cluster. For instance, the size being larger than a first threshold size can indicate a likely non-threat classification because the occurrence of the clustered events is relatively common. In comparison, the size being smaller than the first threshold size or a second, smaller threshold size can indicate a likely threat classification because the occurrences of the clustered events is relatively uncommon The cluster information 614 may be used as baseline cluster information that future event datasets can be compared to, or the cluster information 614 can be compared to a previously-generated baseline to potential threat clusters.

Although the clustering is described in FIG. 6 as being independent of the anomaly scoring of FIG. 5, the two types of processing can be used in conjunction. In particular, the self-organizing map 632 receives a subset of the events in the event stream 642, where this subset includes anomalous events. For example the event stream 642 can be processed by a variational auto-encoder (e.g., the variational auto-encoder 532 in FIG. 5), and the subset can be determined to include events having anomaly scores above a threshold score. In such instances, generating n-grams and hashing the n-grams to generate the event vector can be performed once instead of once for each of the variational-auto encoder and once for the self-organizing map.

Figure 7:
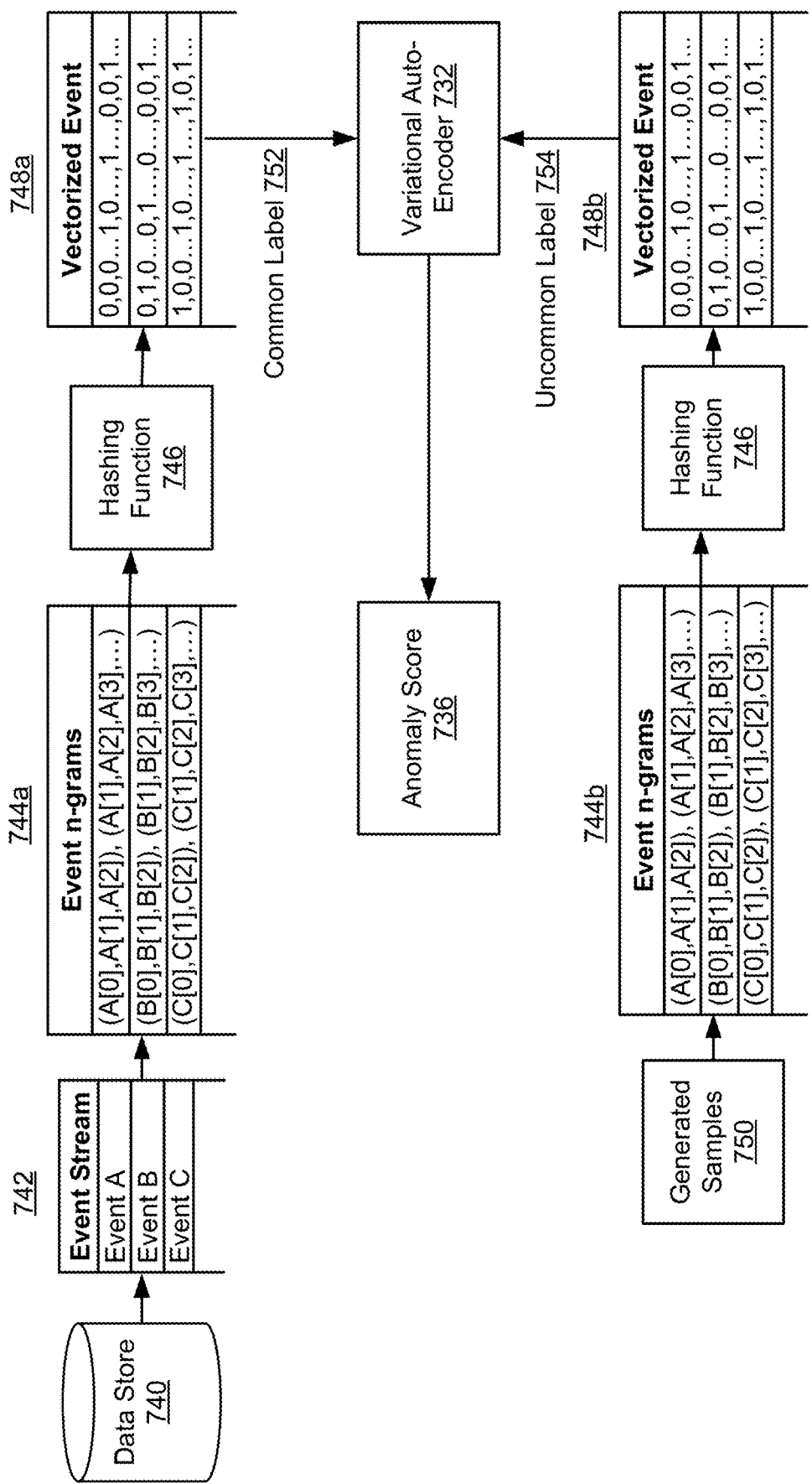
FIG. 7 illustrates a block diagram of an example of training a variational auto-encoder for scoring an event dataset using generated samples, according to an embodiment of the present disclosure.

FIG. 7 illustrates a block diagram of an example of training a variational auto-encoder 732 for scoring an event dataset using generated samples 750, according to an embodiment of the present disclosure. An event stream 742, corresponding to a training event dataset of content request events, is received from a data store 740. Each event can be a piece of training data about a content request (e.g., training data indicating the requested content, the time of the request, the type of client device, and the like). Event n-grams 744a for the event stream 742 are generated from each event of the event stream 742. As illustrated in FIG. 7, an n-gram of 3-grams is used, but other n-grams may be used in other examples. In one particular example, the 3-gram for event A is illustrated as being "(A[0], A[1], A[2]), (A[1], A[2], A[3]) . . . ". A hashing function 746 is then performed on the event n-grams 744a to generate an event vector 748a for each of the events of the event stream 742. The event vector for event A is illustrated as being "0, 0, 0 . . . 1, 0 . . . , 0, 0, 1 . . . ". The event vector 748a is associated with a common label 752, which is a value that the variational auto-encoder 732 can use to learn how to score the abnormality (or lack thereof) of events. The common label 752 indicates that the event vector 748a corresponds to an event that may be commonly found (e.g., that includes parameters commonly included in content requests). Common labels are associated with the different event vectors that are output by the hashing function 746.

In an example, event n-grams 744b are also generated for the generated samples 750. Generates samples 759 represent uncommon events. For example, such samples can include random strings or uncommon parameters likely not present in content requests. The hashing function 746 is then performed on the event n-grams 744b for the generated samples 750 to generate an event vector 748b for each of the events of the generated samples 750. The event vector 748b is associated with an uncommon label 754, which is a value that the variational auto-encoder 732 can use to learn how to score the abnormality of events. The uncommon label 752 indicates that the event vector 748b corresponds to an event that may be uncommonly found (e.g., that includes parameters uncommonly included in content requests). Uncommon labels are associated with the different event vectors that are output by the hashing function 746.

The variational auto-encoder 732 receives the event vectors 748a-b with the associated common label 752 and uncommon label 754 (and similarly other event vectors and their labels) and learns to generate an anomaly score 736 for each event of the event vectors 748a-b. Once trained, the variational auto-encoder 732 can be used to determine anomaly scores for events in a production event dataset, and the event dataset can be filtered into a subset of events having a particular anomaly score prior to being input into another AI model trained for clustering.

Figure 8:
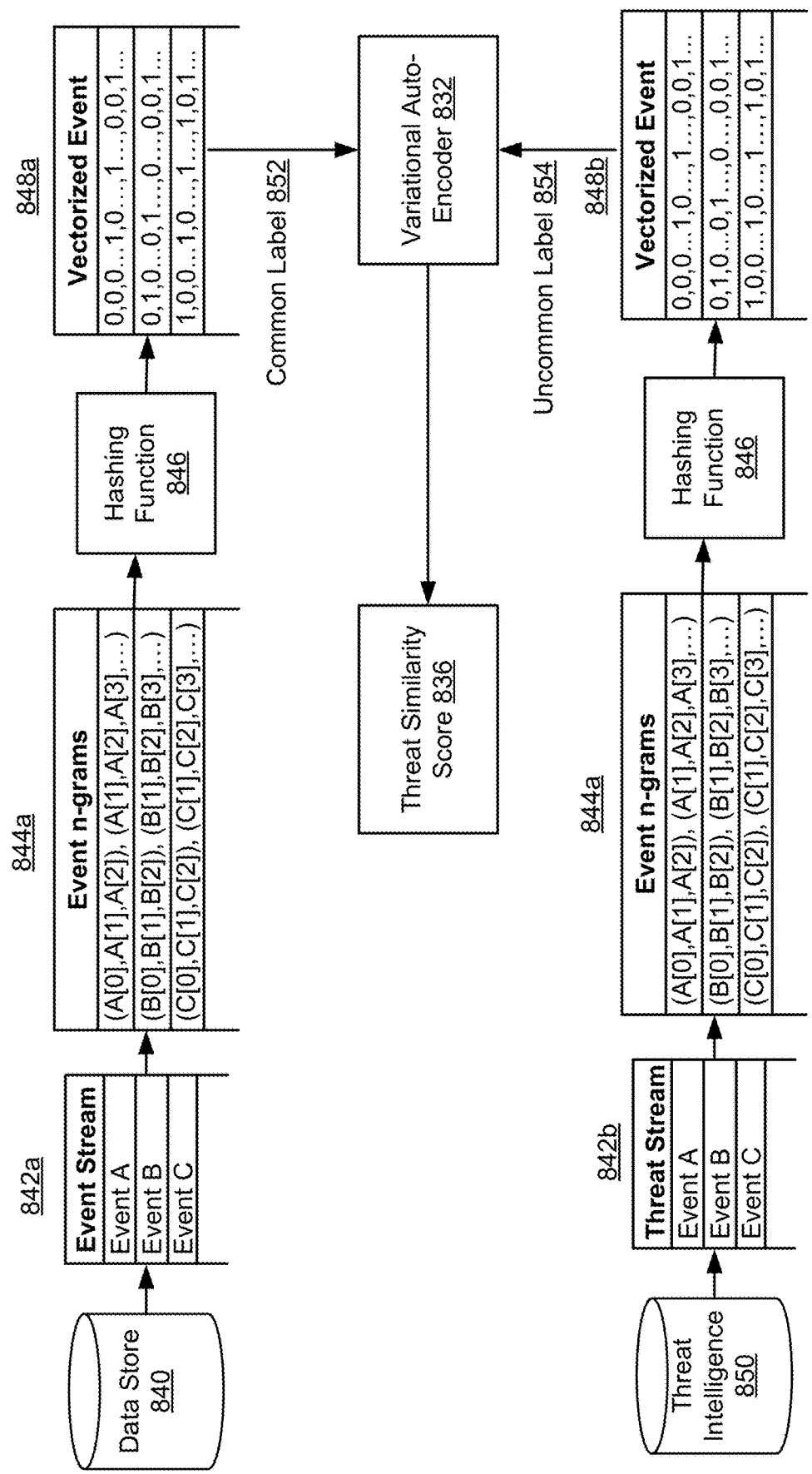
FIG. 8 illustrates a block diagram of an example of training a variational auto-encoder for scoring an event dataset using threat intelligence data, according to an embodiment of the present disclosure.

FIG. 8 illustrates a block diagram of an example of training a variational auto-encoder 832 for scoring an event dataset using threat intelligence data, according to an embodiment of the present disclosure. An event stream 842a, corresponding to a training event dataset of content request events, is received from a data store 840. Each event can be a piece of training data about a content request (e.g., training data indicating the requested content, the time of the request, the type of client device, and the like). Event n-grams 844a for the event stream 842a are generated from each event of the event stream 842a. As illustrated in FIG. 8, an n-gram of 3-grams is used, but other n-grams may be used in other examples. In one particular example, the 3-gram for event A is illustrated as being "(A[0], A[1], A[2]), (A[1], A[2], A[3]) . . . ". A hashing function 846 is then performed on the event n-grams 844a to generate an event vector 848a for each of the events of the event stream 842a. The event vector for event A is illustrated as being "0, 0, 0 . . . 1, 0 . . . , 0, 0, 1 . . . ". The event vector 848a is associated with a common label 852, which is a value that the variational auto-encoder 832 can use to learn how to score the abnormality (or lack thereof) of events. Common labels are associated with the different event vectors that are output by the hashing function 746.

In an example, an event stream 842b, corresponding to a training event dataset of known threat events, is received from a threat intelligence data store 850 and similarly processed. In particular, event n-grams 844b for the event stream 842b are generated from each event of the event stream 842b. The hashing function 846 is then performed on the event n-grams 844b for the known threat events to generate an event vector 848b for each of the known threat events. The event vector 848b is associated with an uncommon label 854, which is a value that the variational auto-encoder 832 can use to learn how to score the abnormality of events. Uncommon labels are associated with the different event vectors that are output by the hashing function 746.

The variational auto-encoder 832 receives the event vectors 848a-b with the associated common label 852 and uncommon label 854 (and similarly other event vectors and their labels) and learns to generate a threat similarity score 836 for each event of the event vectors 848a-b. The threat similarity score 836 for an event can be a type of anomaly score, where this score may not only indicate if an event if likely anomalous, but also whether this anomalous event is a likely threat.

Once trained, the variational auto-encoder 832 can be used to determine anomaly scores (or threat similarity scores) for events in a production event dataset, and the event dataset can be filtered into a subset of events having a particular anomaly score prior to being input into another AI model for clustering the events.

Figure 9:
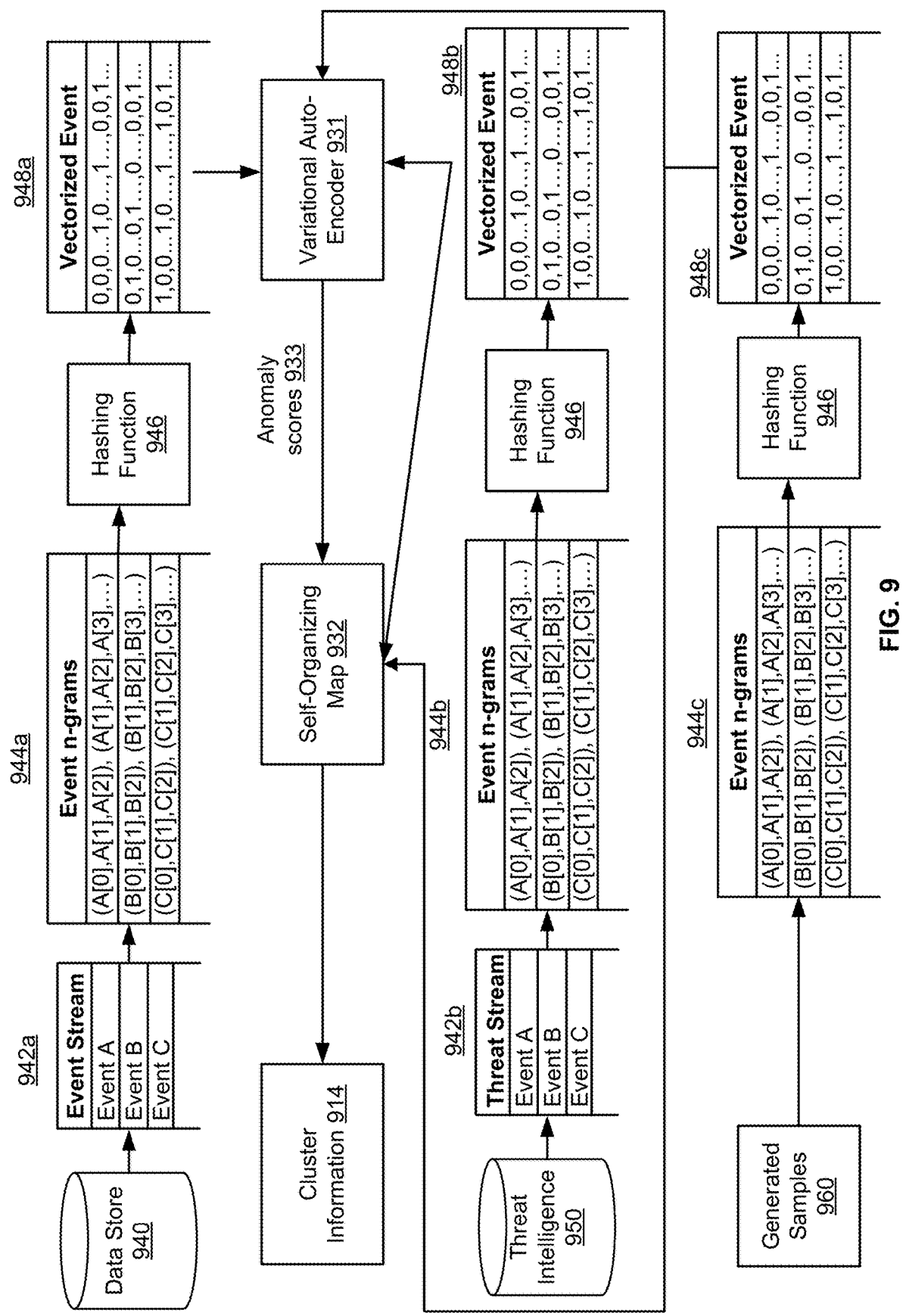
FIG. 9 illustrates a block diagram of an example of training a self-organizing map for clustering an event dataset, according to an embodiment of the present disclosure.

FIG. 9 illustrates a block diagram of an example of training a self-organizing map 932 for clustering an event dataset, according to an embodiment of the present disclosure. An event stream 942a, corresponding to a training event dataset of content request events, is received from a data store 940, similar to the event stream 742 or 842a. Event n-grams 944a for the event stream 942a are generated from each event of the event stream 942a. A hashing function 946 is then performed on the event n-grams 944a to generate an event vector 948a for each of the events of the event stream 942a. Event vectors of such events are input to a variational auto-encoder 931 trained using any or a combination of the techniques described in FIGS. 7-8.

Further, an event stream 942b, corresponding to a training event dataset of known threat events similar to the event stream 842b, is received from a threat intelligence data store 950. Event n-grams 944b for the event stream 942b are generated from each event of the event stream 942b. The hashing function 946 is then performed on the event n-grams 944b for the known threat events to generate an event vector 948b for each of the known threat events. The corresponding event vectors are also input to the variational auto-encoder 931.

Additionally or alternatively to the event stream 942, generated samples 960, similar to the generates samples 750, are received and processed to generate n-grams 944c. These n-grams 944c are input to the hashing function 946 that then outputs an event vector 948c for each generated sample. The corresponding event vectors are also input to the variational auto-encoder 931.

Based on the input, the variational auto-encoder 931 generates anomaly scores 933 corresponding to the different event vectors. These event vectors and the anomaly scores are input to the self-organizing map 932.

The self-organizing map 932 learns to generate cluster information 914 for events. The learning can involve tuning the parameters of the self-organizing map 932 such that this model 932 learns features of events that are associated with similar anomaly scores such that these events can be clustered together. In the case of using the threat intelligence 950, the corresponding anomaly scores are threat similarity score. In this case, the self-organizing map 932 also learns features of events that are associated with particular threat classifications such that event clusters can also be associated with the applicable threat classifications. Once trained, the self-organizing map 932 can be used to associate one or more events in a production event dataset with a classification. Examples of the classification can include a benign classification, a non-threat classification, a threat-classification, or any other suitable classification.

Figure 10:
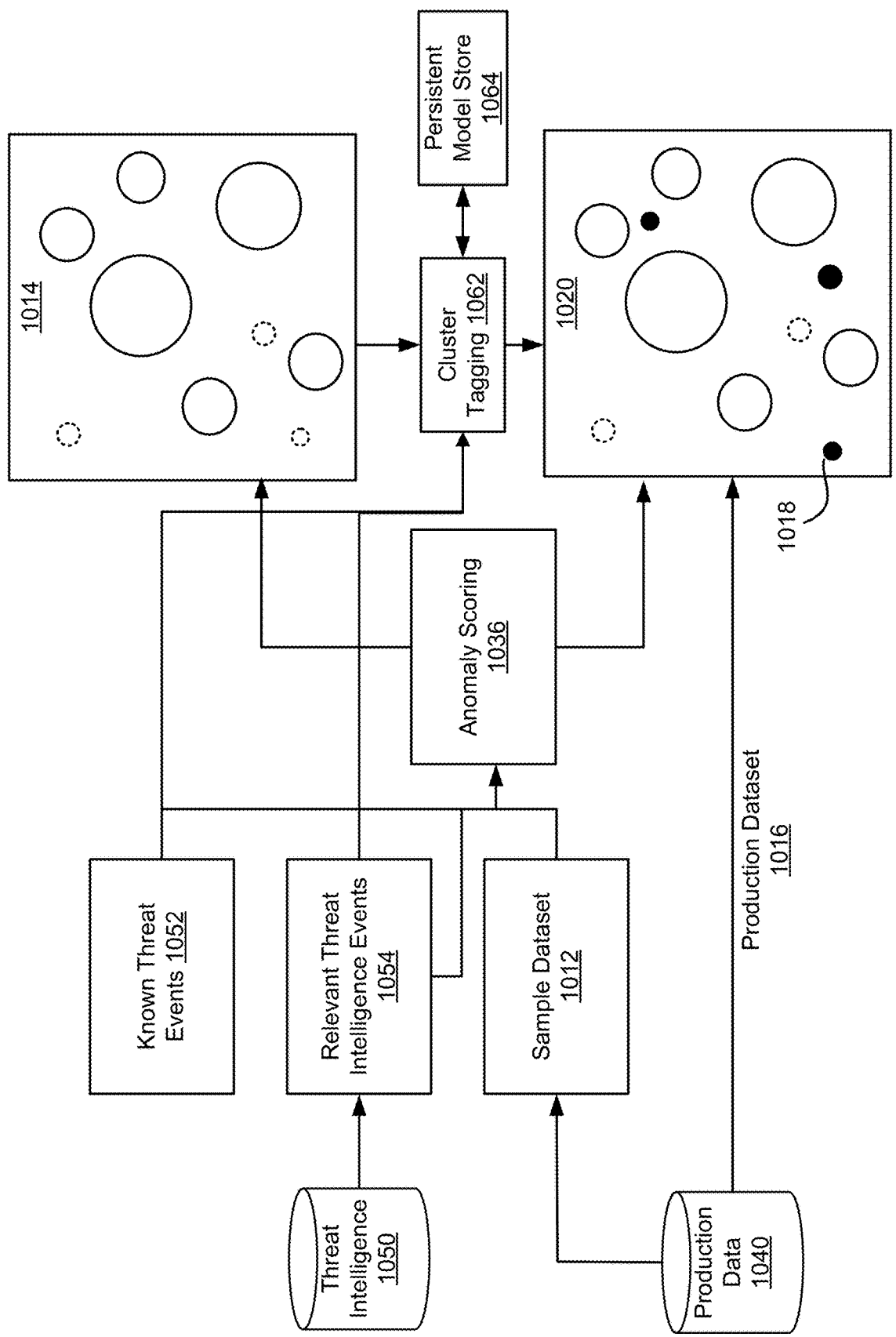
FIG. 10 illustrates a block diagram of an example of a system for determining threats from anomalous events, according to an embodiment of the present disclosure.

FIG. 10 illustrates a block diagram of an example of a system for determining threats from anomalous events, according to an embodiment of the present disclosure. Determining threats can be performed by a computer system hosting AI models, such as the computer system 130 in FIG. 1. To generate baseline cluster information 1014, an AI model that performs anomaly scoring 1036 receives known threat events 1052 (if available), relevant threat intelligence events 1054 (if available), and a sample dataset 1012. The known threat events 1052 represent events that are known to pose a threat. The relevant threat intelligence events 1054 are received from a threat intelligence data store 1050 and can include production data known to include an issue and/or generated data that corresponds to threat data. The sample dataset 1012 corresponds to production data 1040 that is used to generate the baseline cluster information 1014. The AI model can be a variational auto-encoder that performs the anomaly scoring 1036. Another AI model can generate the clusters for the baseline cluster information 1014 based on the anomaly scoring 1036. Cluster tagging 1062 can be performed based on the anomaly scores (e.g., by using such scores for filtering the events and/or by clustering events together at least in part based on their anomaly scores). The threat intelligence data and known threat data (when available) can be used to tag the clusters in the baseline cluster information 1014 with classifications. As illustrated in FIG. 10, the solid-lined clusters in the baseline cluster information 1014 correspond to non-threat clusters and the dashed-line clusters corresponds to threat clusters. The baseline cluster information 1014 and the associated tags can be stored in a persistent model store 1064.

At a later point in time, the AI model can receive a production dataset 1016 from the production data 1040 and determine an anomaly score for the production dataset 1016. The clustering AI model can then cluster the production dataset 1016 based on the anomaly scoring 1036 to generate production cluster information 1020. The production clusters identified for the production dataset 1016 can be compared to the baseline clusters stored in the persistent model store 1064. A production cluster found to correspond to a known non-threat baseline cluster is tagged with a known non-threat classification. A production cluster found to correspond to a known threat baseline cluster is tagged with a known threat classification. A production cluster found to not have a corresponding baseline cluster is tagged with novel, of interest classification. Rather than using a comparison, the baseline cluster information 1014 can also be input to the AI model. Here, the AI model clusters the production events in the baseline clusters and generates new clusters as applicable. The production cluster information 1020 can identify the known non-threat clusters (illustrated as the solid-lined clusters), known threat clusters (illustrated as the dashed-lined clusters), and novel, of interest clusters 1018 (illustrated as the solid-filled clusters). The n novel, of interest clusters 1018 can be further evaluated to determine whether they pose a threat or not.

Figure 11:
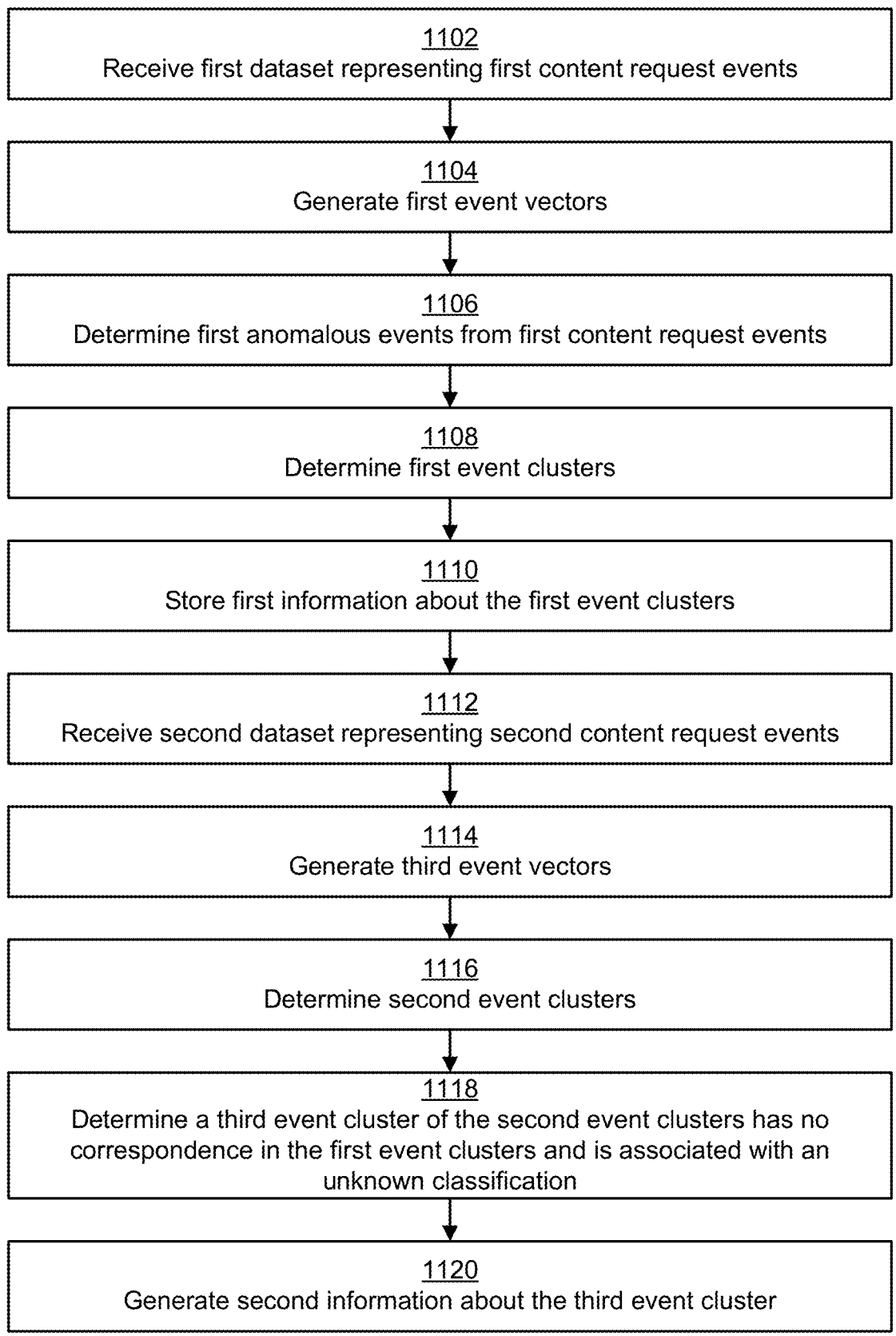
FIG. 11 illustrates an example of a flow for a process of determining threats from anomalous events, according to an embodiment of the present disclosure.
Figure 12:
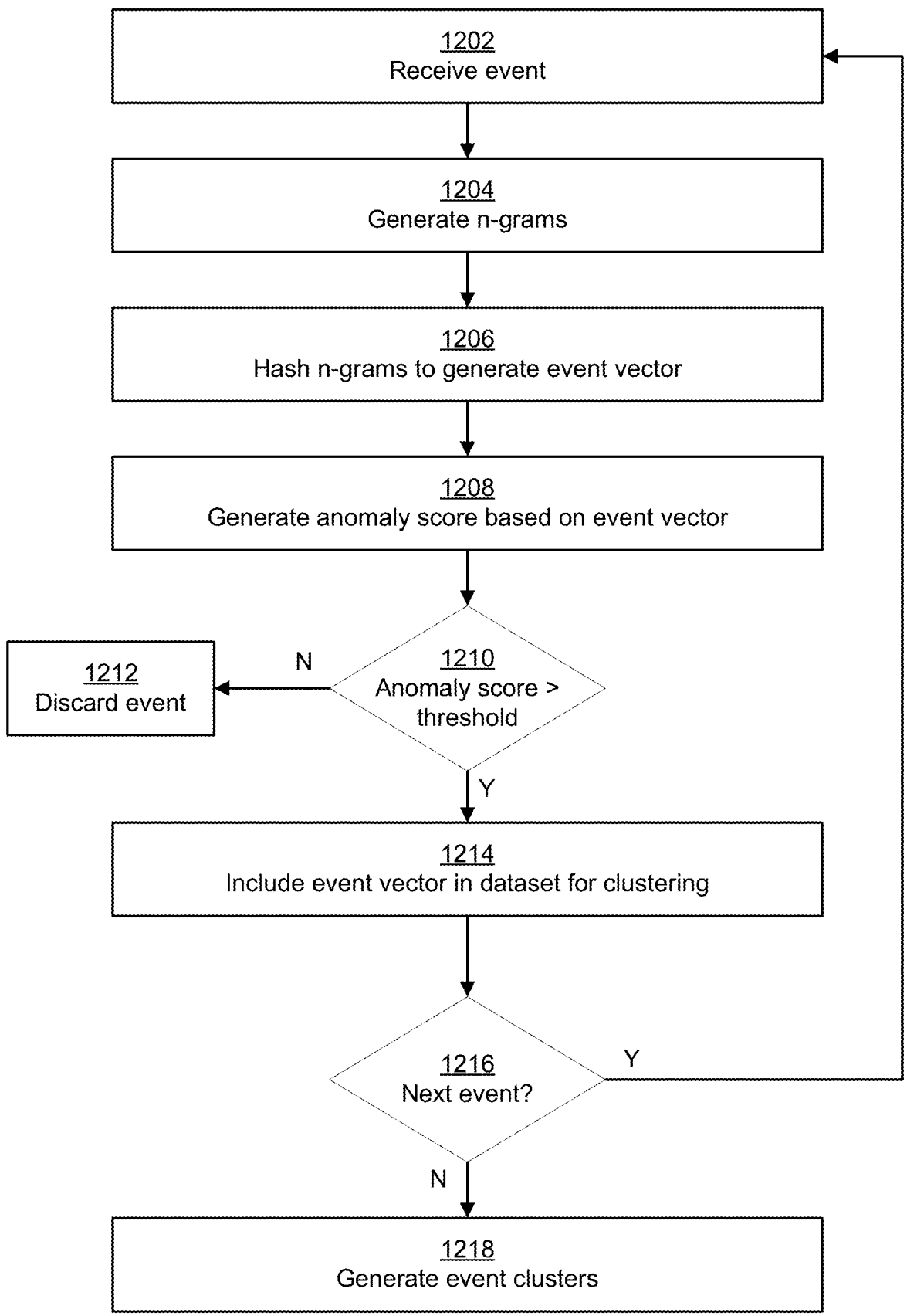
FIG. 12 illustrates an example of a flow for a process of generating event clusters from an event dataset, according to an embodiment of the present disclosure.

FIGS. 11 and 12 illustrate processes associated with detecting and mitigating anomalies, according to an embodiment of the present disclosure. Some or all of the processes (or any other processes described herein, or variations, and/or combinations thereof) may be performed under the control of one or more computer systems, such as the computer system 130 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 11 illustrates an example of a flow for a process of determining threats from anomalous events, according to an embodiment of the present disclosure. In an example, the flow includes operation 1102, where the computer system receives a first dataset that represents first content request events. For example, the first content request events can be for playback of a movie or television show, playback of music, a language selection, or other content request events. The computer system can receive the first dataset from a network service operator device that collects the first content request events.

In an example, the flow includes operation 1104, where the computer system generates first event vectors from the first dataset. The computer system can generate n-grams, such as 3-grams, from a content request event of the first content request events and then hash the n-grams to generate an event vector for the content request event. The first event vectors can include the event vector for each of the first content request events of the first dataset.

In an example, the flow includes operation 1106, where the computer system determines first anomalous events from the first content request events. The computer system can use the first event vectors as input to a first AI model to determine first anomalous events. The first AI model can determine an anomaly score associated with each event vector of the first event vectors. The computer system can then determine that particular anomaly scores, such as anomaly scores above a threshold, are associated with anomalous events. So, the first anomalous events can correspond to events that are associated with the particular anomaly scores.

In an example, the flow includes operation 1108, where the computer system determines first event clusters. The computer system can use second event vectors as input to a second AI model to determine the first event clusters. The second event vectors can correspond to the first anomalous events. The second AI model can be a self-organizing map trained for clustering events.

In an example, the flow includes operation 1110, where the computer system stores first information about the first event clusters. The first information can indicate that a first event cluster of the event clusters is associated with a threat classification and that a second event cluster of the first event clusters is associated with a non-threat classification. The threat classification and the non-threat classification for the first event cluster and the second event cluster, respectively, may be determined based on threat intelligence data of known threat events. For example, the first event cluster can include a known threat event of the threat intelligence data, so the computer system can determine that the first event cluster should be associated with the threat classification. Alternatively, the second event cluster may not include any known threat event of the threat intelligence data, so the computer system can determine that the second event cluster should be associated with the non-threat classification.

In an example, the flow includes operation 1112, where the computer system receives a second dataset representing second content request events. The second content request events can be production data collected by the network service operator device and then sent to the computer system. The computer system may receive the second dataset, and additional datasets, at a predetermined interval, such as every twenty-four hours.

In an example, the flow includes operation 1114, where the computer system generates third event vectors. The computer system can generate n-grams, such as 3-grams, from a content request event of the second content request events and then hash the n-grams to generate an event vector for the content request event. The third event vectors can include the event vector for each of the second content request events of the second dataset.

In an example, the flow includes operation 1116, where the computer system can determine second event clusters. The computer system can use the third event vectors as input to the second AI model to determine the second event clusters. Additionally, the first information can be input to the AI model. Some of the second event clusters may correspond to event clusters in the first event clusters, and some of the second event clusters may not correspond to event clusters in the first event clusters.

In an example, the flow includes operation 1118, where the computer system determines a third event cluster of the second event clusters has no correspondence in the first event clusters and is associated with an unknown classification. The third event cluster can cluster a subset of the second content request events. The computer system can determine that the third event cluster is a different cluster than any cluster in the first event cluster and therefore has no correspondence in the first event clusters. Since the third event cluster has no correspondence in the first event clusters, the computer system cannot determine whether the third event cluster is to be associated with the threat classification or the non-threat classification, so the computer system determines the third event cluster is associated with an unknown classification.

In an example, the flow includes operation 1120, where the computer system generates second information about the third event cluster. The second information can indicate that the subset is associated with the unknown classification. The second information may be provided to the client device, such that the client device, or a user of the client device, can analyze the subset to determine whether the subset is associated with a threat classification or a non-threat classification.

FIG. 12 illustrates an example of a flow for a process of generating event clusters from an event dataset, according to an embodiment of the present disclosure. In an example, the flow includes operation 1202, where the computer system receives an event. The event can be part of a dataset of content request events. For example, the content request events can be for playback of a movie or television show, playback of music, a language selection, or other content request events. The computer system can receive the event from a client device.

In an example, the flow includes operation 1204, where the computer system generates n-grams. A number of n-grams may be determined based on a desired amount of context that is to be included in the n-grams and a computational complexity of processing the n-grams. For example, a 2-grams may not provide enough context, but a 4-grams may be too computationally complex for the computer system to process. So, a 3-grams can be generated for the event.

In an example, the flow includes operation 1206, where the computer system hashes the n-grams to generate an event vector. The computer system performs a hashing function on the n-grams to generate the event vector. Examples of the hashing function can include SHA-1, MD-5, or any other suitable hashing function.

In an example, the flow includes operation 1208, where the computer system generates an anomaly score based on the event vector. The computer system can input the event vector to an AI model, such as the variational auto-encoder 532 in FIG. 5 to determine the anomaly score.

In an example, the flow includes operation 1210, where the computer system determines whether the anomaly score is greater than a threshold. The threshold can represent an anomaly score above which an event is unlikely to commonly occur. So, if the anomaly score is greater than the threshold, the computer system can determine that the event corresponds to an anomalous event. If the anomaly score is below the threshold, the computer system can determine that the event corresponds to a non-anomalous event. If the anomaly score is greater than the threshold, the flow proceeds to operation 1214. Otherwise, the flow proceeds to operation 1212.

In an example, the flow includes operation 1212, where the computer system discards the event. The computer system discards the event based on determining that the event corresponds to an anomaly score that is considered to be non-anomalous. Since the anomaly score is non-anomalous, the event is unlikely to be associated with a threat, so the event is discarded from additional analysis.

In an example, the flow includes operation 1214, where the computer system includes the event vector in a dataset for clustering. The computer system includes the event based on determining that the event corresponds to an anomaly score that is considered to be anomalous. Since the anomaly score is anomalous, the event may be associated with a threat, so the event is retained for additional analysis.

In an example, the flow includes operation 1216, where the computer system determines whether there is a next event. If there is a next event, the flow returns to operation 1202. Otherwise, the flow proceeds to operation 1218.

In an example, the flow includes operation 1218, where the computer system generates event clusters. The computer system can input the event vector for each event included in the dataset for clustering to an AI model, such as the self-organizing map 632 in FIG. 6 to generate the event clusters. The AI model may additional classify each of the event clusters as a threat classification, a non-threat classification, or an unknown classification based on a comparison to baseline event clusters. The computer system can output the event clusters, and optionally the classifications, to the network service operator device so that the network service operator device can determine whether the events are associated with threats.

Figure 13:
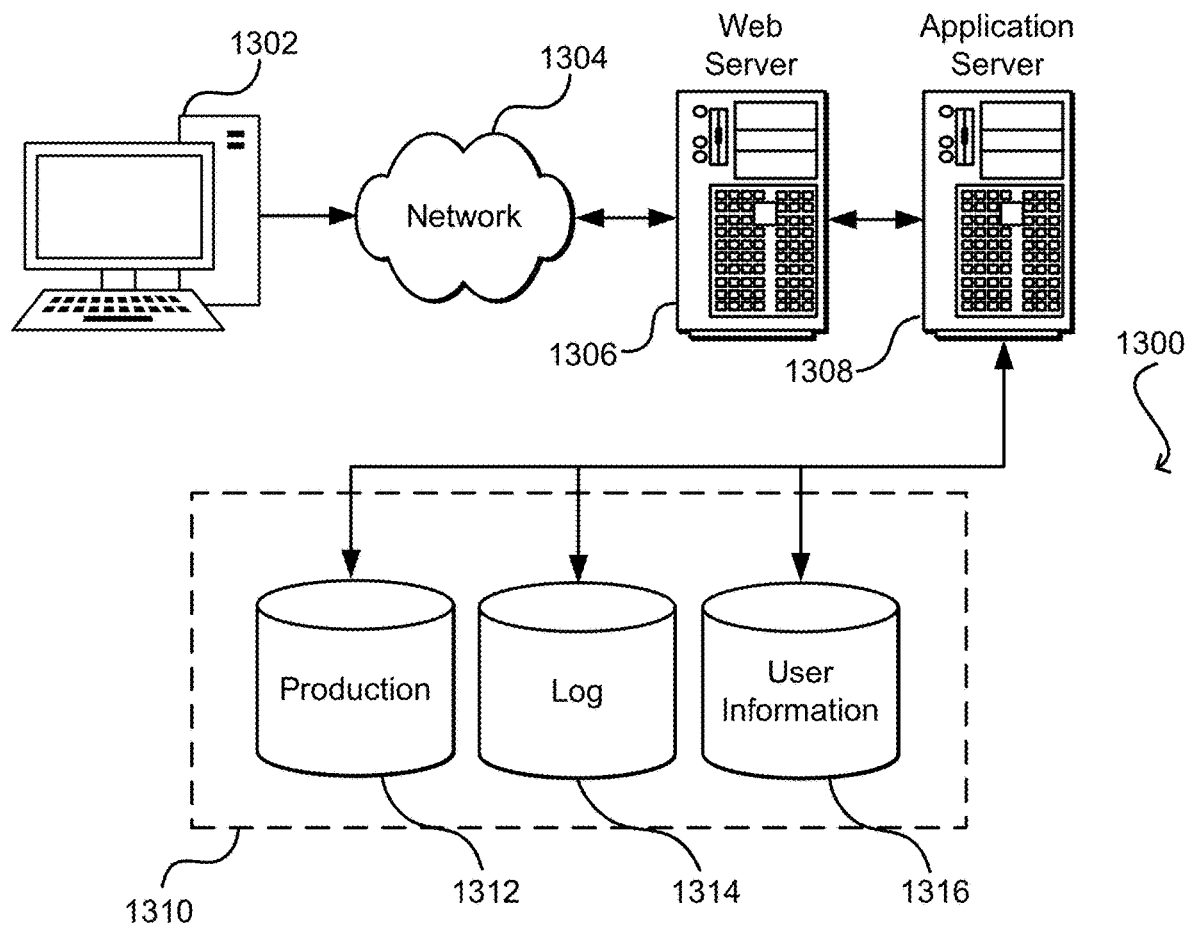
FIG. 13 illustrates aspects of an example environment for implementing aspects in accordance with various embodiments.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302 (network service operator device 110 of FIG. 1), which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as JavaR, C, C#, or C++, or any scripting language, such as Perl, Python, or TCL, as well as combinations thereof. The server(s) may also include database servers, including without limitation those commercially available from OracleR, MicrosoftR, SybaseR, and IBMR.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD- ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
one or more processors; and
one or more memory storing computer-readable instructions that, upon execution by the one or more processors, configure the system to:
receive a first dataset that represents first content request events;
generate first event vectors from the first dataset;
determine, by using the first event vectors as input to a first artificial intelligence model, first anomalous events from the first content request events;
determine, by using second event vectors as input to a second artificial intelligence model, first event clusters, the second event vectors corresponding to the first anomalous events, the first event clusters comprising a first event cluster and a second event cluster, the first event cluster clustering a first subset of the first content request events, the second event cluster comprising a second subset of the first content request events;
store first information about the first event clusters, the first information indicating that the first event cluster is associated with a threat classification and that the second event cluster is associated with a non-threat classification;
receive a second dataset that represents second content request events;
generate third event vectors from the second dataset;
determine, by using the third event vectors as input to the second artificial intelligence model, second event clusters, the second event clusters comprising a third event cluster, the third event cluster clustering a subset of the second content request events;
determine that the third event cluster has no correspondence in the first event clusters and is associated with an unknown classification; and
generate second information about the third event cluster, the second information indicating that the subset is associated with the unknown classification.

2. The system of claim 1, wherein the one or more memory store additional computer-readable instructions that, upon execution by the one or more processors, further configure the system to:
determine, by using the third event vectors as input to the first artificial intelligence model, that the second content request events are second anomalous events, wherein the third event vectors are input to the second artificial intelligence model based at least in part on the second content request events being second anomalous events.

3. The system of claim 1, wherein the one or more memory store additional computer-readable instructions that, upon execution by the one or more processors, further configure the system to:

determine that a fourth event cluster of the second event clusters corresponds to the first event clusters and is associated with the threat classification; and determine that a fifth event cluster of the second event clusters corresponds to the second event cluster and is associated with the non-threat classification.

4. The system of claim 1, wherein generating the first event vectors comprises:

generating n-grams from a content request event of the first content request events; and hashing the n-grams to generate an event vector, wherein the first event vectors comprise the event vector.

5. A computer-implemented method comprising:

storing, based at least in part on an output of a first artificial intelligence model, first information about first event clusters that include a first event cluster and a second event cluster, the first information indicating that the first event cluster is associated with a threat classification and that the second event cluster is associated with a non-threat classification, the first event cluster clustering first events, the second event cluster clustering second events;

receiving a first dataset that represents third events corresponding to content requests;

generating a first event vector based at least in part on the first dataset;

determining, based at least in part on using the first event vector as a first input to the first artificial intelligence model, second event clusters that include a third event cluster;

determining that the third event cluster has no correspondence in the first event clusters and is associated with an unknown classification, the third event cluster clustering a subset of the third events; and generating second information about the third event cluster, the second information indicating that the subset is associated with the unknown classification.

6. The computer-implemented method of claim 5, further comprising:

prior to receiving the first dataset:

receiving a second dataset that represents the first events and the second events;

generating a second input to the first artificial intelligence model based at least in part on the second dataset; and determining, by using the second input to the first artificial intelligence model, the first event clusters.

7. The computer-implemented method of claim 6, further comprising:

generating a third input to a second artificial intelligence model based at least in part on the second dataset; and determining, by using the third input to the second artificial intelligence model, anomalous events from the first events and the second events, wherein the second input corresponds to the anomalous events.

8. The computer-implemented method of claim 5, further comprising:

generating a second input to a second artificial intelligence model based at least in part on the first dataset; and determining, by using the second input to the second artificial intelligence model, anomalous events from the third events, wherein the first input corresponds to the anomalous events.

9. The computer-implemented method of claim 5, wherein generating the first input comprises:

generating, based at least in part on the first dataset, n-grams that correspond to an event of the third events; and hashing the n-grams to generate an event vector of the event, wherein the first input comprises the event vector.

10. The computer-implemented method of claim 5, further comprising:

determining a first size of the first event cluster and a second size of the second event cluster;

determining that the first event cluster is likely associated with the threat classification based at least in part on the first size being smaller than a threshold size; and determining that the second event cluster is likely associated with the non-threat classification based at least in part on the second size being larger than the threshold size.

11. The computer-implemented method of claim 10, further comprising:

determining an anomaly score based at least in part on anomalous events clustered in the first event cluster, wherein the first event cluster is determined to be likely associated with the threat classification further based at least in part on the anomaly score.

12. The computer-implemented method of claim 5, further comprising:

prior to receiving the first dataset:

receiving a second dataset that represents known threat events;

generating a second input to the first artificial intelligence model based at least in part on the second dataset;

determining, by using the second input to the first artificial intelligence model, that a known threat event of the known threat events is clustered in the first event cluster; and associating the first event cluster with the threat classification based at least in part on the known threat event.

13. One or more non-transitory computer-readable storage media storing instructions that, upon execution on a system, cause the system to perform operations comprising:

storing, based at least in part on an output of a first artificial intelligence model, first information about first event clusters that include a first event cluster and a second event cluster, the first information indicating that the first event cluster is associated with a threat classification and that the second event cluster is associated with a non-threat classification, the first event cluster clustering first events, the second event cluster clustering second events;

receiving a first dataset that represents third events corresponding to content requests;

generating a first event vector based at least in part on the first dataset;

determining, based at least in part on using the first event vector as a first input to the first artificial intelligence model, second event clusters that include a third event cluster;

determining that the third event cluster has no correspondence in the first event clusters and is associated with an unknown classification, the third event cluster clustering a subset of the third events; and generating second information about the third event cluster, the second information indicating that the subset is associated with the unknown classification.

14. The one or more non-transitory computer-readable storage media of claim 13, wherein the operations further comprise:
   prior to receiving the first dataset:
      receiving a second dataset that represents the second events and a third dataset that represents sample events;
      generating, based at least in part on the second dataset, second input, wherein the second input is associated with a common label;
      generating, based at least in part on the third dataset, third input, wherein the third input is associated with an uncommon label; and
      training a second artificial intelligence model based on the common label and the uncommon label,
   wherein the first input is generated based at least in part on an output of the second artificial intelligence model.

15. The one or more non-transitory computer-readable storage media of claim 13, wherein the operations further comprise:
   prior to receiving the first dataset:
      receiving a second dataset that represents the second events and a third dataset that represents known threat events;
      generating, based at least in part on the second dataset, second input, wherein the second input is associated with a common label;
      generating, based at least in part on the third dataset, third input, wherein the third input is associated with an uncommon label; and
      training a second artificial intelligence model based on the common label and the uncommon label,
   wherein the first input is generated based at least in part on an output of the second artificial intelligence model.

16. The one or more non-transitory computer-readable storage media of claim 13, wherein the operations further comprise:
   prior to receiving the first dataset:
      receiving a second dataset that represents the second events;
      generating a second input to a second artificial intelligence model based at least in part on the second dataset;
      determining, by using the second input to the second artificial intelligence model, anomalous events from the second events; and
      training the first artificial intelligence model based at least in part on a subset of the second dataset, the subset corresponding to the anomalous events.

17. The one or more non-transitory computer-readable storage media of claim 13, wherein the operations further comprise:
   prior to receiving the first dataset:
      receiving a second dataset that represents known threat events; and
      training the first artificial intelligence model based at least in part on the second dataset, the first artificial intelligence model trained to associate one or more event clusters with the threat classification.

18. The one or more non-transitory computer-readable storage media of claim 13, wherein the operations further comprise:
   generating a second input to a second artificial intelligence model based at least in part on the first dataset; and
   determining, by using the second input to the second artificial intelligence model, anomalous events from the third events, wherein the first input corresponds to the anomalous events, wherein the first artificial intelligence model comprises a self-organizing map, and wherein the second artificial intelligence model comprises a variational auto-encoder.

19. The one or more non-transitory computer-readable storage media of claim 13, wherein the operations further comprise:
   determining that a first event of the third events has correspondence to the first event cluster;
   generating a similarity score between the first event and the first events of the first event cluster;
   determining the similarity score is below a threshold; and
   discarding the first event from the first event cluster.

20. The one or more non-transitory computer-readable storage media of claim 13, wherein the first dataset is received from a client over an interface, and wherein the operations further comprise sending the second information to the client over the interface.

* * * * *